(12) United States Patent
Bozarth et al.

(10) Patent No.: US 9,754,016 B1
(45) Date of Patent: Sep. 5, 2017

(54) DYNAMIC CONTENT DISCOVERABILITY

(75) Inventors: Bradley J. Bozarth, Sunnyvale, CA (US); Mingjing Huang, San Francisco, CA (US); Kenneth M. Karakotsios, San Jose, CA (US); Isaac S. Noble, Soquel, CA (US)

(73) Assignee: Amazon Technologies, Inc., Reno (*) Notice: Subject to any disclaimer, the term of this patent is extended or adjusted under 35 U.S.C. 154(b) by 48 days.

(21) Appl. No.: 12/980,770

(22) Filed: Dec. 29, 2010

(51) Int. Cl.
*G06F 17/30* (2006.01)

(52) U.S. Cl.
CPC .. *G06F 17/30616* (2013.01); *G06F 17/30654* (2013.01)

(58) Field of Classification Search
CPC .............. G06F 17/30616; G06F 17/30654
USPC .................................. 707/708, 741, 772
See application file for complete search history.

(56) References Cited

U.S. PATENT DOCUMENTS

| | | | |
|---|---|---|---|
| 6,360,216 B1* | 3/2002 | Hennessey et al. | |
| 7,154,620 B1* | 12/2006 | Ogura et al. | 358/1.15 |
| 2004/0039564 A1* | 2/2004 | Mueller | 704/9 |
| 2004/0176958 A1* | 9/2004 | Salmenkaita et al. | 704/275 |
| 2006/0020614 A1* | 1/2006 | Kolawa et al. | 707/100 |
| 2007/0038500 A1* | 2/2007 | Hammitt et al. | 705/9 |
| 2007/0043687 A1* | 2/2007 | Bodart | G06Q 10/107 |
| 2007/0060099 A1* | 3/2007 | Ramer et al. | 455/405 |
| 2008/0052026 A1* | 2/2008 | Amidon et al. | 702/104 |
| 2010/0161600 A1* | 6/2010 | Higgins et al. | 707/736 |
| 2010/0179961 A1* | 7/2010 | Berry et al. | 707/769 |
| 2010/0325122 A1* | 12/2010 | Yassin | 707/759 |
| 2011/0006971 A1* | 1/2011 | Ebey | G06F 1/1616 345/1.3 |
| 2011/0137776 A1* | 6/2011 | Goad et al. | 705/34 |
| 2011/0283230 A1* | 11/2011 | Gnanasambandam et al. | 715/810 |
| 2011/0289015 A1* | 11/2011 | Mei et al. | 705/347 |
| 2011/0307354 A1* | 12/2011 | Erman | G06F 8/60 705/27.1 |
| 2011/0307562 A1* | 12/2011 | Chakra et al. | 709/206 |

* cited by examiner

*Primary Examiner* — Grace Park
(74) *Attorney, Agent, or Firm* — Polsinelli LLP

(57) ABSTRACT

A user interacting with an electronic device can receive suggestions for applications or services that can help the user with a specific task. The user might enter information that can be processed semantically to determine one or more actions, objects, or other types of information useful in discovering related applications or services, which might be local or remote to that device. One or more of these discovered applications or services is selected to suggest to the user based on any number of criteria, such as user behavior, preferences, location, time of day, etc. Using such an approach, a device can utilize a semantic process to attempt to infer an action or intent relating to a simple or complex task, and can discover and suggest applications or services that can assist with that task even where the user is unaware of, or not looking for, such an application or service.

23 Claims, 8 Drawing Sheets

Verbs / Actions walk
order
reserve
visit
call
meet
...

FIG. 5(a)

| order | buy |
|---|---|
|  | purchase |
|  | rent |
|  | obtain |
| walk | exercise |
| ... | ... |

FIG. 5(b)

| action | object | provider |
|---|---|---|
| walk | dog | dogwalk.com |
| walk | dog | dogs-r-us.net |
| walk | * | walkers.org |
| walk | exercise | healthwalk.net |
| walk | charity | walkforlife.cc |
|  | ... |  |

FIG. 5(c)

Service Setup

| | |
|---|---|
| Service name: | Babysitting in Seattle |
| Service identifier: | Agm35qkn3 |
| Primary Action: | care (for, of) ▽ |
| Object(s):<br>*Up to three* | child |
| | baby |
| | kid |
| Geographic region: | within [3] miles of:<br>Greater Seattle High School ☑ |
| Availabilty: | Monday  5:00 pm ▽  to  10:00 pm ▽ |
| | Tuesday  5:00 pm ▽     10:00 pm ▽ |
| | Wed.    ▽           ▽ |

DYNAMIC CONTENT DISCOVERABILITY

BACKGROUND

Users are increasingly relying upon various electronic and computing devices to store, track, and update various types of information and handle various types of tasks. For example, many users rely upon computing devices to store contact information, user schedules, task lists, and other such information. Further, users also store various types of files and addresses such as media files, email messages, and Web site links. Oftentimes, there are applications and services that can help a user to perform a certain task or otherwise assist with managing information on such a device. In many cases, however, the user will be unaware of at least some of these applications and services, or even that applications or services of that type exist or could be helpful. Further, even if a user thinks to look for an application or service to help with a task, for example, it can be difficult for the user to locate an appropriate application or service if the user does not know the correct words to use to locate that application or service. Similarly, it can be difficult for application and service providers to reach appropriate users as the providers might not know the best words to use, and also may not know how to get the word out to users that their application or service can assist with certain tasks.

BRIEF DESCRIPTION OF THE DRAWINGS

Various embodiments in accordance with the present disclosure will be described with reference to the drawings, in which:

FIGS. 5(a), (b), and (c) illustrate example tables that can be used to define, implement, and/or utilize semantic vocabularies in accordance with at least one embodiment;

FIG. 6 illustrates an example interface enabling a provider to specify information for discovery in accordance with at least one embodiment;

DETAILED DESCRIPTION

Systems and methods in accordance with various embodiments of the present disclosure overcome one or more of the above-referenced and other deficiencies in conventional approaches to matching user needs, actions, or intents with things that can assist the user. In particular, various embodiments provide the ability to analyze user input or actions with respect to an electronic device, and perform semantic processing on that action or input in an attempt to infer an action or intent relating to a simple or complex task. The semantic processing in at least some embodiments can attempt to determine words that can be useful in discovering related applications or services able to assist with a task. In many cases, the user might be unaware that such applications or services can help or even exist. One or more of these applications or services can be suggested to the user as potentially being able to help with the user task. Various types of information, such as location, time of day, user behavior or preferences, and availability can be used as well to attempt to select optimal applications or services to suggest to the user. In many cases, the user might not be looking for help with a task but performing a specific task for which help might be available.

In at least some embodiments, a fixed set of action words is provided to enable a user or device to discover various applications or services, in order to simplify semantic processing and improve results, among other advantages. While a provider might utilize other words or mappings to enable clear selection of action words, objects, etc., each provider in at least one embodiment must ultimately map a service or application to at least one of the set of action words. In some embodiments, any object can be used to distinguish different applications or services associated with an action word.

In some embodiments, a user might perform a task such as to enter a task into a "to-do" list, schedule an appointment, create a memo, or perform another such task. The device can analyze information for those activities to attempt to infer an action or intent using semantic processing. In some cases, a device can monitor the status of existing information, and can attempt to discover applications or services in response to certain events or states. For example, if a user is determined to be unable to make a meeting based on current location of the device, the device can attempt to discover an application or service that can help with moving the meeting, finding another person to sit in on the meeting, etc. If a provider becomes available that can assist with an existing task, the device can provide a suggestion based upon the new information.

Various other functions and advantages are described and suggested below as may be provided in accordance with the various embodiments.

Figure 1:
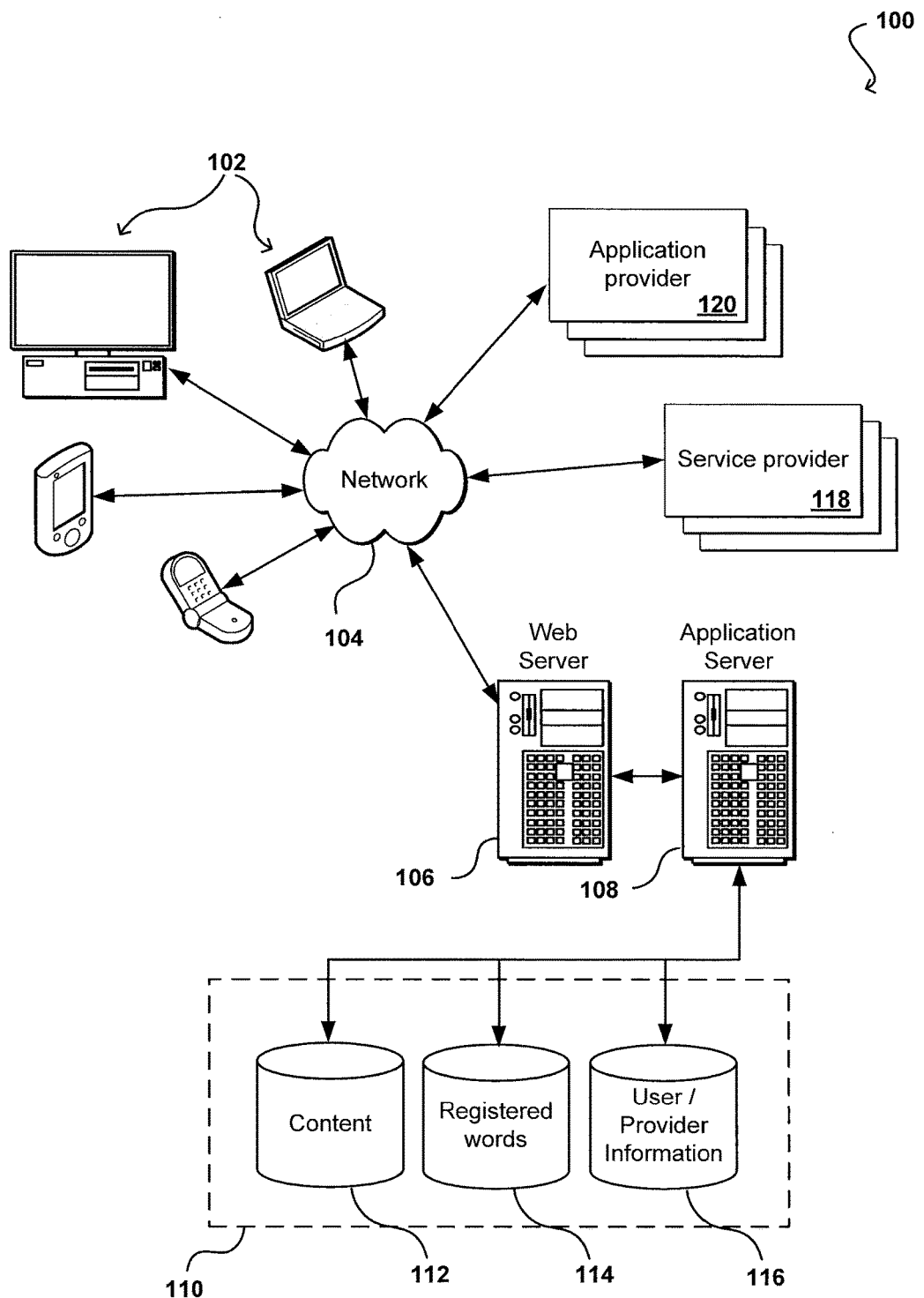
FIG. 1 illustrates an environment in which various embodiments can be implemented.

As will be discussed, different approaches can be implemented in various environments in accordance with the described embodiments. For example, FIG. 1 illustrates an example of an environment 100 for implementing aspects in accordance with various embodiments, wherein a device is able to discover applications and services available remotely, such as across at least one network. As will be appreciated, although a Web-based environment is used for purposes of explanation, different environments may be used, as appropriate, to implement various embodiments. The system includes at least one electronic client device 102, which can include any appropriate device operable to send and receive requests, messages or information over an appropriate network 104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 106 for receiving requests and serving content in response thereto, although for other networks an alternative device serving a similar purpose could be used, as would be apparent to one of ordinary skill in the art.

The illustrative environment includes at least one application server 108 and a data store 110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 102 and the application server 108, can be handled by the Web server 106. It should be understood that the Web and application servers are not required and are merely example components, as structured code discussed herein can be executed on any appropriate device or host machine as discussed elsewhere herein.

The data store 110 can include several separate data tables, databases or other data storage mechanisms and media for storing data relating to a particular aspect. For example, the data store illustrated includes mechanisms for storing content 112 and user information 116, which can be used to serve content. The data store also is shown to include a mechanism for storing registered words 114 for purposes of discovery, etc. It should be understood that there can be many other aspects that may need to be stored in the data store, such as page image information and access rights information, which can be stored in any of the above listed mechanisms as appropriate or in additional mechanisms in the data store 110. The data store 110 is operable, through logic associated therewith, to receive instructions from the application server 108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

Figure 2:
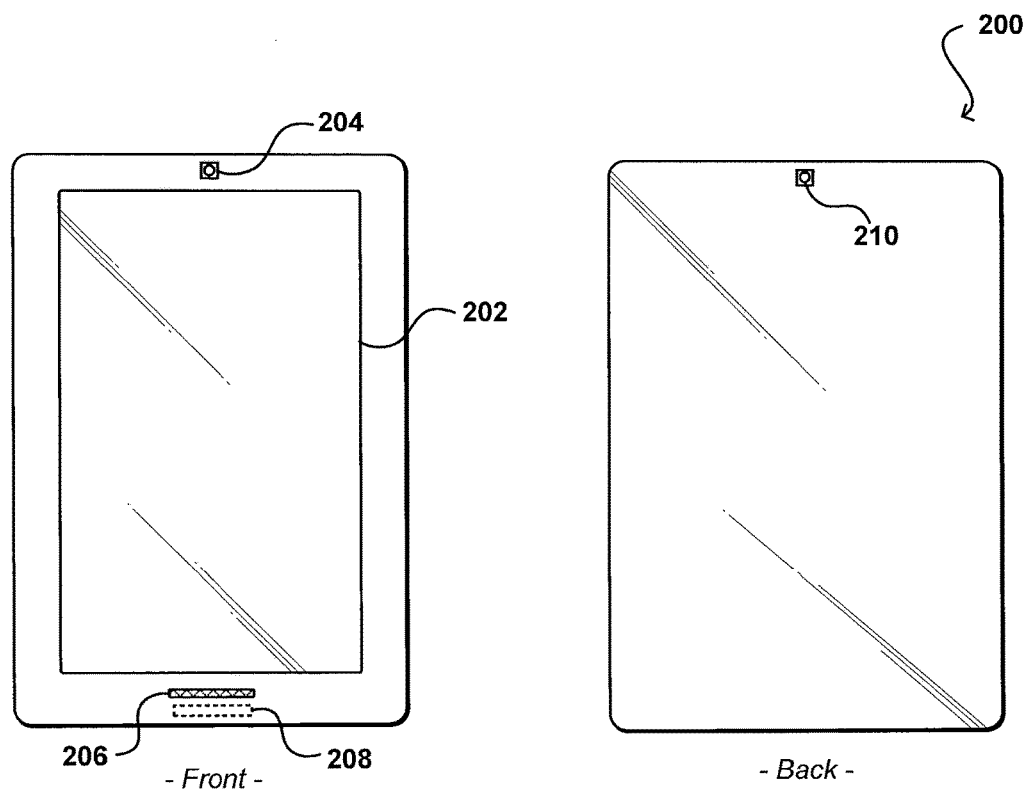
FIG. 2 illustrates front and back views of an example user device that can be utilized in accordance with various embodiments.

FIG. 2 illustrates front and back views, respectively, of an example electronic user device 200 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 200 has a display screen 202 on the front side, which under normal operation will display information to a user facing the display screen (e.g., on the same side of the computing device as the display screen). The computing device in this example includes a front image capture element 204 and a back image capture element 210 positioned on the device such that, with sufficient wide angle lenses or other such optics, the computing device 200 is able to capture image information in substantially any direction about the computing device. Each image capture element may be, for example, a camera, a charge-coupled device (CCD), a motion detection sensor, or an infrared sensor, among many other possibilities. If there are multiple image capture elements on the computing device, the image capture elements may be of different types. Further, each image capture element can comprise a digital still camera, configured to capture subsequent frames in rapid succession, or a video camera able to capture streaming video.

The example computing device 200 also includes a microphone 206 or other audio capture device capable of capturing audio data, such as words or commands spoken by a user of the device. In this example, a microphone 206 is placed on the same side of the device as the display screen 202, such that the microphone will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. It should be understood, however, that a microphone might be located on any appropriate surface of any region, face, or edge of the device in different embodiments, and that multiple microphones can be used for audio recording and filtering purposes, etc.

The example computing device 200 also includes at least one position and/or orientation determining element 208. Such an element can include, for example, an accelerometer or gyroscope operable to detect an orientation and/or change in orientation of the computing device, as well as small movements of the device. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 3:
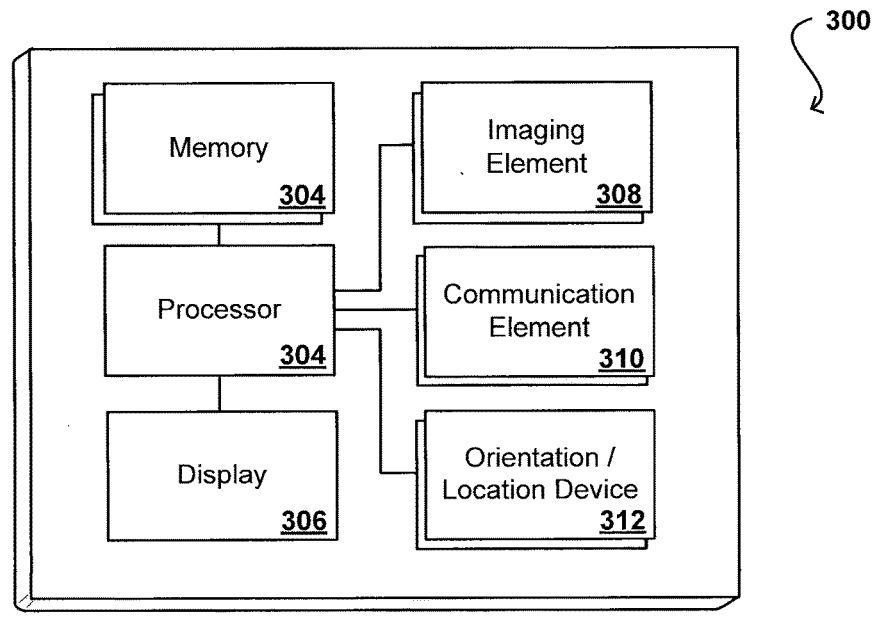
FIG. 3 illustrates example components of a user device that can be utilized in accordance with various embodiments.

FIG. 3 illustrates a logical arrangement of a set of general components of an example computing device 300 such as the device 200 described with respect to FIG. 2. In this example, the device includes a processor 302 for executing instructions that can be stored in a memory device or element 304. As would be apparent to one of ordinary skill in the art, the device can include many types of memory, data storage, or non-transitory computer-readable storage media, such as a first data storage for program instructions for execution by the processor 302, a separate storage for images or data, a removable memory for sharing information with other devices, etc. The device typically will include some type of display element 306, such as a touch screen or liquid crystal display (LCD), although devices such as portable media players might convey information via other means, such as through audio speakers. As discussed, the device in many embodiments will include at least one image capture element 308 such as a camera or infrared sensor that is able to image projected images or other objects in the vicinity of the device. Methods for capturing images or video using a camera element with a computing device are well known in the art and will not be discussed herein in detail.

In some embodiments, the computing device 300 of FIG. 3 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 300 also can include at least one orientation, movement, and/or location determination mechanism 312. As discussed, such a mechanism can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 302, whereby the device can perform any of a number of actions described or suggested herein.

As an example, a computing device such as that described with respect to FIG. 2 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As is known in the art, a user can input information into a device such as those described with respect to FIGS. 2 and 3 in a number of different ways. For example, a user might enter an appointment into a schedule or calendar application, might add a task to a "to-do" list, might create a memo (text, voice, or video), or perform another such action. In some embodiments, a user might activate a listening mode on the device that enables the user to speak, motion, or otherwise provide input that can be captured and translated by the device in order to convey certain information to the device. For example, the user might speak information about a contact or upcoming meeting, ask to provide information to an application, etc. The device can translate the input and determine one or more appropriate actions to take, such as storing text information in an appropriate location, launching an application, scheduling an appointment, generating a task, etc.

An intent of, or purpose for, each of these actions can be determined, at least in part, using one or more semantic processing techniques. For example, a user can provide input such as "I need to walk the dog tonight." The device can process this information as needed, such as to utilize voice recognition for audio input or image/optical character recognition for image or video input, in order to arrive at a textual (or other appropriate) form for semantic analysis. Once the input is obtained and any necessary format processing executed, the device (or a service or system in communication with the device) can attempt to parse the input into specific types of input. For example, a semantic processing algorithm might attempt to parse the input string into subjects, objects, verbs, nouns, time-modifiers, and/or any other appropriate type of input. As is known for techniques such as search query processing, the input string can be further processed before semantic analysis to remove stop words ("a," "an," "the," etc.), any non-alphanumeric characters, redundant words, etc., thereby increasing the speed and accuracy of the semantic processing. In the example of the input "I need to walk the dog tonight," a semantic processing algorithm might identify the subject as the user (based upon "I" and/or the context), an action or verb as "walk," the object of the action as "dog," and a time-modifier of "tonight." Words such as "need" might be recognized as words that do not need processing in certain examples where there is an action word (such as "need to" do something) but might be utilized where a user provides input without a verb such as ("need milk") where the device could infer an action such as "obtain". Various other approaches to parsing and analyzing an input string are known in the art and will not be discussed herein in detail.

Once the input string has been parsed and processed by one or more semantic algorithms, the device (or a system or service in communication therewith) can attempt to take action based upon the input. In this case, the user has indicated that the user has to perform an action ("walk") on an object ("dog") at a certain time ("tonight"). The device can utilize the time information and the context, as well as analysis of the action, to determine that this input corresponds to a task for the user to perform at a certain time, whereby the device can perform an action such as to add an entry to the user's calendar for this evening, create a reminder, generate a to-do item, or perform another such action.

In many instances, there might be an application or service that can assist the user in performing such a task, or otherwise assisting with some aspect relating to the user input. It will often be the case, however, that there is no easy way to automatically associate those applications or services with the input and/or provide those applications or services as options for the user.

Systems and methods in accordance with various embodiments can attempt to locate or "discover" applications, services, programs, modules, systems, or other devices or entities (referred to herein generically as "applications" for purposes of simplicity of explanation) that might be able to assist a user with some aspect of user input. In the case of a user inputting information about a task to be performed, the device can attempt to discover and suggest applications that can assist the user with that task. In the above example of the user walking his or her dog, the device can attempt to discover an application on the device or on a remote system or device (i.e., in the cloud) that can walk the dog for the user, help the user to walk the dog, or otherwise assist in some way with the user walking the dog (e.g., providing a raincoat for the dog if it is raining or purchasing "clean up" bags for use during the walk).

Figure 4A:
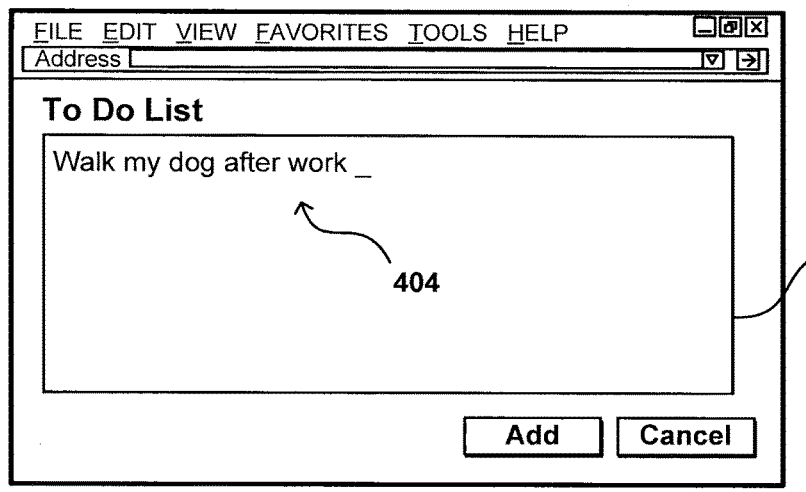
FIGS. 4(a), (b), (c), (d), (e), and (f) illustrate an example interface enabling suggestions to be provided to, and managed for, a user in accordance with various embodiments.
Figure 4B:
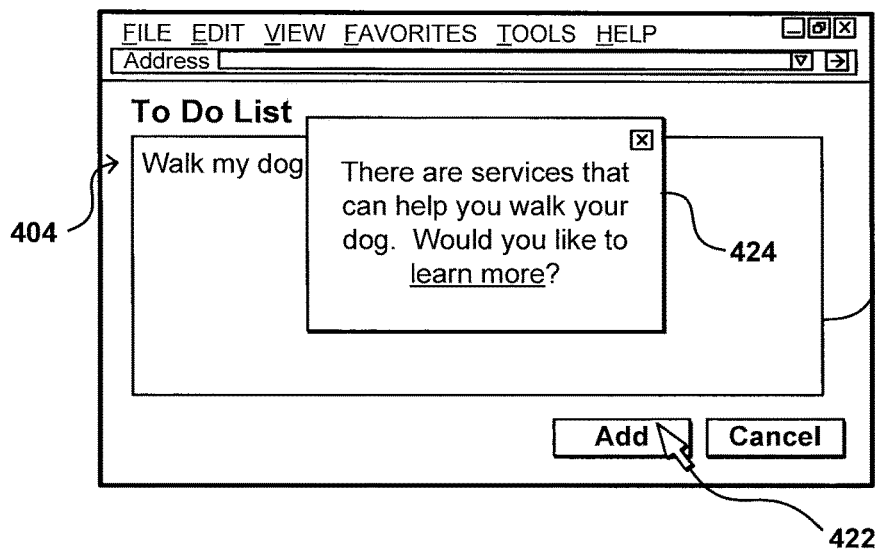

When an application is discovered that might assist (or otherwise be of value to) the user, the device can cause that information to be conveyed to the user in any of a number of ways (at least in cases where the application is not executed automatically as discussed elsewhere herein). For example, FIG. 4(a) illustrates an example interface state 400 wherein a user has entered into a text box 402 for a to-do list that the user has a new task 404, in this case to walk the dog after work. After semantic processing, the device discovers that there is at least one application matching at least some portion of the task 404, and can provide that information to the user. For example, in the example interface state 420 of FIG. 4(b), the device can perform the analysis upon the user performing an action such as selecting an "add" element 422 or similar element (while in other embodiments the device can perform the analysis with each character entered, or at any other appropriate time(s)). Upon discovering at least one application, the device can display to the user a notification 424, in any appropriate form such as a pop-up or modal window, indicating that the user might be interested in applications or services that can help the user to walk the dog. If there is a single match with a specific way of assisting, the notification might contain more specific information, for example, while in other embodiments information about each application discovered can be listed for the user to scroll through or otherwise navigate. If the user is interested, the user can select an option to obtain additional information, accept the service, etc. If the user is not interested, the user can close or ignore the notification, or perform another such action. As will be discussed elsewhere herein, a user selecting or ignoring a suggestion for a task can be stored and tracked as behavior or other such information, which can be helpful in assisting with future suggestions by the device.

If a user selects an application or service to help with a specific task, a device in accordance with various embodiments can alter or update the information displayed for that task to reflect the selection. For example, the task "walk my dog after work" can be updated with information indicating that a selected service will perform, or otherwise assist with, that task. Other appropriate information can be displayed (or otherwise available) as well, such as contact information for the provider, terms of the service being provided, time and location information, etc. In some embodiments, the actual task entry might be amended as appropriate. For example, and entry such as "walk my dog after work" could be altered to "Service X will walk my dog at 5:30." In some embodiments, the device can work with the provider or a discovery service, for example, to further update the information as appropriate. For example, after the dog has been walked by the service provider, the device could update the task entry to show that the task has been completed, including time and location information, etc. In some embodiments, the user might receive a notification that the task was completed. The user might also receive a request to rate that provider, as well as an option to select that provider to assist with future tasks of that type, add that provider to a list of preferred providers for that user, etc. Various other options can be provided as well within the scope of the various embodiments.

Figure 4C:
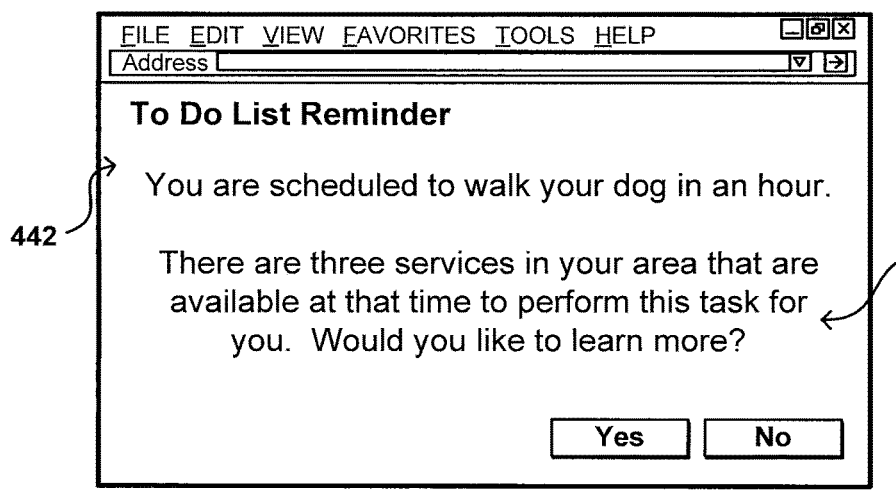

Various other approaches to notifying the user of a discovered application or service can be utilized as well. For example, in the interface state 440 of FIG. 4(c) the user is provided with a notification 444 that there are three services that can help the user walk the dog when a reminder 442 is displayed to the user. This notification 442 can be in addition, or alternative, to the notification 424 of FIG. 4(b). Such an approach can be helpful when the user is reminded of an upcoming task, but might be unable to perform (or at least would like help in performing) that task. In this case, the user can select to learn more about the services, and can receive options such as to have a pet care service walk the dog for the user. Various other notification and applications could be utilized as well as should be apparent in light of the present disclosure.

Figure 4D:
Figure 4E:
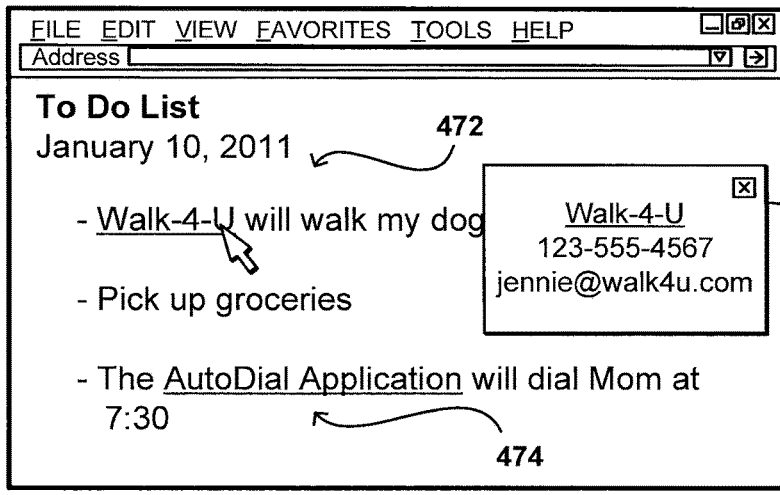
Figure 4F:
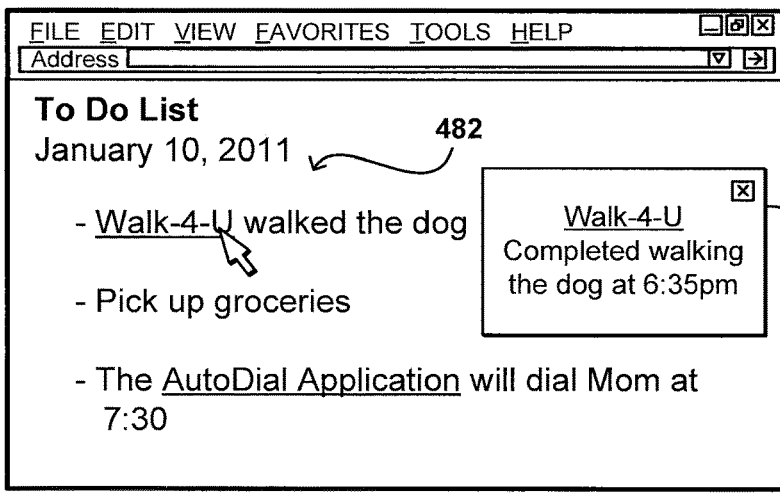

FIG. 4(d) illustrates an example of a to-do list 460 that can be displayed to a user of an electronic device, in this case listing the tasks entered for the user for a particular date. This example includes three tasks to be accomplished on the selected date. As discussed above, if the user selects an application or service to assist with any of these tasks, information for the task can be updated accordingly. For example, in the updated display 470 of the to-do list illustrated in FIG. 4(e), the user has selected a service entitled "Walk-4-U" to assist with the task of walking the dog. Accordingly, the entry 472 has been updated to reflect that "Walk-4-U will walk [the user's] dog." In this example, the user can mouse over (or otherwise select) the name of the service or another portion of the entry 472 to obtain more information. In this example, a modal window 476 can be displayed that includes contact information for the service, although other information for the service information can be displayed and/or updated as appropriate. In at least some embodiments, the user can initiate a call or message to the service from this window. In this example, the user also has selected an application to help call the user's mother, as reflected by the corresponding updated entry 474. FIG. 4(f)

shows another state 480 of the to-do list, with the entry 482 for the task of walking the dog having been again updated to reflect that the task was completed by the service. A similar modal window 486 (or other such approach) can be used to provide the user with details of the completion or performance. Various other updates and displays of information can be utilized as well in accordance with the various embodiments as should be apparent in light of the teachings and suggestions contained herein.

In order for the device to be able to associate applications and services with user actions, input, or other such information, the device (or a system or service in communication with the device) can determine some aspect of that input that can be associated with the application or service. One way to determine an association is to enable each application to provide a "purpose" or "goal" that can be assisted in some way by, or can benefit in some way from, that application. In at least some embodiments, application or service providers are able to provide one or more actions (e.g., verbs) and one or more objects (e.g., nouns) that can be used to define such a purpose or goal. Certain conventional approaches enable users to tag applications with certain words that can be used to locate the applications and/or associate these applications with certain inputs or requests. Such approaches can be relatively difficult to manage, however, as there can be a virtually infinite number of words and word combinations that can be used to tag applications, and with no standards or guidelines it can be difficult to correlate certain applications with certain requests. For example, a request such as "walk my dog" may not match up with "exercise the pet" without some way to correlate the terms and/or intent. It would be difficult to know that two different users submitting terms such as "alarm" and "clock" may intend the same thing, without a significant amount of computer intelligence and/or processing.

Approaches in accordance with certain embodiments provide a set of actions that can be used to provide for application discovery. In at least some embodiments, the set is a fixed and/or standardized set of words selected to cover a majority of possible actions or purposes. Limiting the size of the vocabulary that a semantic engine has to process and/or translate can improve the speed and accuracy of the process, as enabling a provider to use any tag (or any of a large number of tags) can decrease the efficiency as well as increase the number of false positives and false negatives. As an example, FIG. 5(*a*) illustrates a list 500 of actions (e.g., verbs) that can be used by application or service providers to specify one or more purposes or goals that can be associated with their application or service. In at least some embodiments, a provider must select one of these action words to be used in locating that application. In some embodiments, a provider might map certain terms to one or more of the set of action terms. For example, FIG. 5(*b*) illustrates a mapping 520 of some of the selected action terms to other terms with similar meanings. Such an approach can help a provider to select the correct action word. For example, a provider might want their application to be suggested to users who are interested in renting an automobile. If the word "rent" is not offered as an action word, the provider might not know the correct word to select. In this example, "rent" is mapped to the action word "order". By enabling the provider to select the word "rent" but then mapping that selection to the action word "order," the system can ensure that the application is stored and/or referenced in the system using the standardized list of action terms.

In order to more clearly define purposes and goals that can be associated with an application or service, however, it can be desirable in at least some environments to enable the provider to modify the action or explain how that action is used. For example, a provider offering a service to "rent a car" and a provider offering a service to "buy your groceries" might both select the action word "order" in the above example, but the services may be significantly different and it can be desirable to provide suggestions that are more appropriate for a given input or task. Accordingly systems and methods in accordance with various embodiments can enable one or more objects to be associated with an action word for a provider. In some cases the objects can also be selected from a set, while in other embodiments a provider can select any appropriate object term(s). For example, FIG. 5(*c*) illustrates a table 540 mapping actions and specific objects to various providers. Although URLs are used to refer to providers in this example, it should be understood that provider information can correspond to paths and filenames of applications on the device, addresses of remote services, identities of individual providers, etc. In this example, different providers are able to provide different objects for the same action word. For example, two providers can be seen to suggest purposes or goals relating to walking a dog, while other providers have purposes such as walking for charity or exercise. Another provider utilizes a wildcard to be associated with any object for the action word "walk." Such a list can be maintained at any appropriate location, such as on the device, exposed as a network service, stored at a central server, etc. In some embodiments, each provider can be associated with a fixed number of action words and objects, while in other embodiments at least the number of objects might be unlimited. In some embodiments, a provider might have to pay a service or other such entity based upon the number of action words and/or objects to be used for association.

FIG. 6 illustrates an example of an interface 600 or template that can be used by an application or service provider in order to enable discovery of the respective application or service. Such an approach can enable a provider to input information such as not only the action word(s) and objects to be used to locate the application or service, but also information that can be used to select and/or suggest appropriate applications or services to users based on other relevant criteria. Further, it should be understood that "provider" can refer to different types of entities or persons. For example, an application provider can refer to a software developer that provides an application to be executed on the device or remote from the device, while a service provider can correspond to an entity exposing a remote application as a "software" service or "Web service," for example, or a person or entity offering a traditional or consumer-related "service" through the system, where the service can refer to any conventional service such as walking a dog, babysitting, providing insurance, landscaping, financial advice, etc. For example, FIG. 6 illustrates an interface 600 where a person who is able to provide a conventional service (here, babysitting) is able to fill out information enabling that service to be located or discovered, and suggested to one or more users. This person can expose his or her individual service for discovery through the template-collected and/or formatted information. In some embodiments, this person might work with a different service provider, such as a babysitting service that contracts with various individuals to provide babysitting services, acting as an intermediary or proxy between users and the individual providers. Yet another service provider might provide the software service through which the information can be discovered. Each of these entities can be referred to as a "service provider" in accordance with various aspects and embodiments.

As mentioned above, FIG. 6 illustrates an example interface or template that can be used by a service provider to enter information useful in associating a respective application or service with user input or other such information. In this example, the template has basic information such as the name of the service and an identifier used to track the provider in the system. The template also enables the provider to select at least one action word 602, where the number of action words selectable can depend in some embodiments upon a type of the provider, an agreement, and/or a fee paid by the provider. In this example where there is a fixed set of action words, the provider might select the action word(s) from at least one drop-down list or similar element. The provider also can specify one or more objects 604 to be used with the action word for discovery. The number of objects available also can depend upon factors such as the type of user, agreement, fees, etc. In this example, the provider is able to enter any appropriate term(s) in the text boxes or other appropriate elements.

For certain types of service, there might be other types of options or information that can be specified in order to better match users with specific services. In FIG. 6, where the provider is offering babysitting services, the provider can specify information such as geographical information 606 specifying the area(s) in which the service can be provided. This can be specified in any appropriate way, such as by specifying a town, county, distance from an address or location, etc. Such information can be advantageous, as a person might be interested in available babysitters in the community but not from another state or country, etc. Similarly, the provider can specify one or more times of availability 608, which can include information such as times and days of the week, specific periods, etc. Such information also can be advantageous, as a person looking for child care during the day might not be interested in a teenager who is only able to babysit after school. As should be apparent in light of the present disclosure, various other types of information can be used and tracked as well as would be advantageous for such purposes, such as personal references, rate information, etc. It also should be understood that there can be limits placed on the number of objects and/or action words that can be associated with an application or service in order to prevent the system from having to store and manage an unnecessarily large amount of data as well as to improve the quality of matches for users with specific needs.

In some cases, a provider might receive a software development kit (SDK) to assist the provider in setting up a service or application, which may or may not utilize a specific template. In some embodiments, the provider can utilize at least one API to register with a discovery service, for example, and provide information necessary for a device to discover that service or application. In at least some embodiments, the provider also can provide an interface that enables a device, user, or other entity to submit requests for service that might be outside the specification of the service. For example, a provider might indicate that their normal hours of operation are Monday through Friday from 9-5, but might make exceptions in certain cases. These providers can enable a user to submit a request for service at another time, which then can be accepted, denied, ignored, or otherwise handled by the provider. Other options are possible as well, such as submitting requests for negotiated rates, additional or fewer options, etc.

As discussed, entities such as third parties or specific service providers can provide and/or utilize their own filters and/or mappings in order to improve matching for specific contexts, uses, etc. As discussed, various mappings can be maintained that provide flexibility in terminology or semantics but that ensure compliance with system standards. Providers can thus utilize a "soft" interface (e.g., a soft API) that enables those providers to register their own filters or mappings, for example, to match elements of the recognized semantics. Further, such an approach enables a single provider to obtain a significant amount of traffic for a major action word/object combination, such as "buy software" but then match those requests to more specific providers based on other information, such as user identity, context, or other such information.

In some cases, a provider might not know the appropriate and/or optimal action words and/or objects to use in matching information. Approaches in accordance with various embodiments can collect and/or aggregate data from multiple users with respect to semantics and application or service selection and usage. For example, various types of statistics can be collected, such as may relate to which types of inputs users enter, which actions or objects are associated with those inputs, which types of services are recommended, and how often the users select those services when recommended. The provider or developer can then determine aspects such as which words are most often associated with services of a particular type, which types of request are being underserved, where needs exist for applications for certain tasks, etc. Developers can also learn information such as how often certain types of suggestions are followed, and the type of information that resulted in those suggestions being followed. Similarly, users can utilize such aggregated information to obtain results for actions that are most often utilized by other users. As should be understood, users can be allowed to submit such information anonymously or prevent such information from being captured for that user.

Various other types of information can be utilized as well to suggest or discover applications and services for a user. In some embodiments, a device (or system or service in communication therewith) can analyze contextual, historical, or behavioral information for a user to attempt to suggest applications or services. For example, if a user never selects individual providers but always selects services from larger entities, the device can sort or filter out certain suggestions for individuals. If a user always looks for ratings before selecting an application, the device can filter or sort by rating. If a user never looks to services, or always declines suggestions, the device might not provide such suggestions.

In some embodiments, however, the device might always attempt to provide helpful situations unless the user has asked or configured the device otherwise. For example, a user might enter information into a device where the user is unaware that there is an application or service that can be of assistance or value. A user generating a note to remember to walk the dog might not be aware that there are services out there that can help the user with that task. In some cases, the user might know those services exist but might not be aware that there are highly related services in the user's area, that there are services recommended by friends, etc. In some cases, the user simply might not have the time to research various options. Certain users will appreciate the device offering to provide help for various tasks, even if the user more often than not does not utilize any of the suggestions.

Certain users may be annoyed by a constant string of suggestions and can turn off or otherwise limit the number of suggestions to certain types, etc.

An advantage to such an approach is that a user may not have been proactively searching for anything, and might not even know that an application or service exists. The user can be engaging in any type of task, or any type of information can exist, on the device that can cause a relevant application or service to be discovered and a suggestion provided to the user. In some cases, the device can monitor the user's behavior and attempt to infer actions or intents, and attempt to discover applications or services that can assist the user. For example, if the user is continually looking up words in a thesaurus application to enter in a word processing application, the system might infer action and object words such as "find" and "words" to suggest thesaurus services that work with the word processing application. A device can analyze any information, behavior, or action, and attempt to discover an application or service that can be of help to a user.

In some embodiments, a user also can have the ability to vote or rate various suggestions. For example, if the device displays a suggestion that the user does not like, or does not think is applicable, the user can rate the suggestion with a "thumbs down" or similar negative or unfavorable rating. If the user follows a suggestion to obtain additional information and/or utilize the suggested application or service, the user can provide a rating such as a number of stars or numerical value. These ratings can be aggregated and provided to users with suggestions, used to select various services, or otherwise utilized.

It should be understood, however, that the applications and services need not necessarily be located remotely, but could also be stored on the device itself. For example, a user might have antivirus software installed that also protects against malware. If the user is unaware of this feature of the application, the user might generate a note reminding the user to look into getting software to protect against malware. In such an example, the device could generate a notification to the user that the device already has such an application, and ask if the user wants to obtain more information, launch the application, etc. In some cases a device might have come pre-installed with certain applications, such as photo editing software, and a user adding a calendar entry to upload photos might receive a suggestion to utilize a photo editing program already on the device. In some cases, a user might receive suggestions that include both suggestions for applications on the device and applications or services in the cloud, etc. For example, a user entering a reminder to set an alarm for a trip might receive a suggestion for a wake-up call service offered by a remote provider, and might also receive a suggestion for a clock application on the device that includes an alarm. In some embodiments, the device might look to applications already on the device before looking to remote sources. The alternate might also be the case, based upon aspects such as user preferences or device configuration, etc. For example, it might be assumed (or determined based on past behavior) that the user is already generally aware of the features of his or her device, and is primarily interested in other services.

Figure 7:
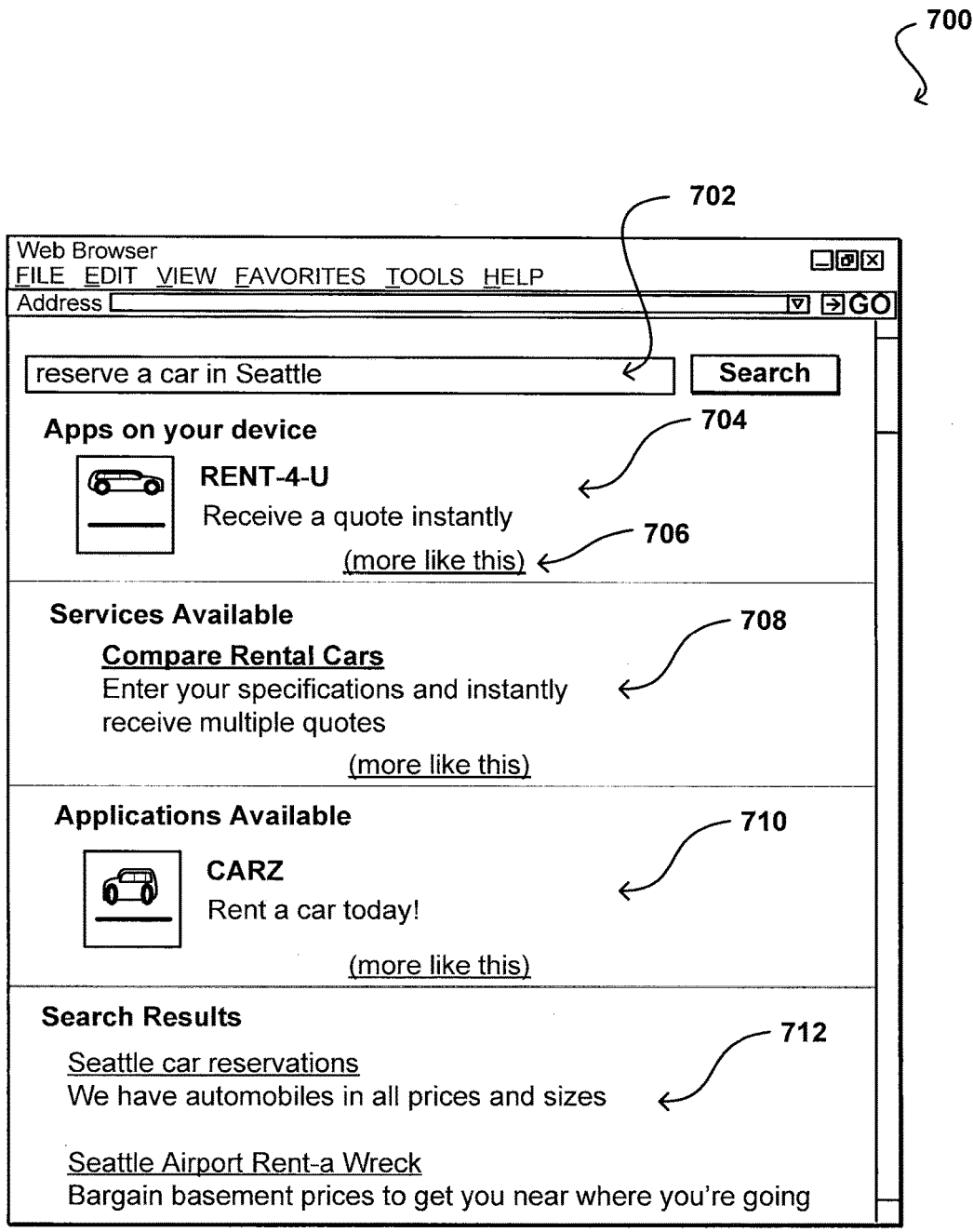
FIG. 7 illustrates a search results interface page that can be used to provide suggestions in accordance with at least one embodiment.

It should be understood, however, that such functionality can also be utilized when a user is specifically searching for information or content. For example, FIG. 7 illustrates an example search results interface page 700 wherein the user has entered a search query 702 of "reserve a car in Seattle." As is known in the art, and thus will not be discussed herein in detail, the query can be processed against at least one search index to locate a set of matching search results 712, which can be returned to the user on the search results page. In addition, the device, or a remote system or service in communication with the device and/or processing the search query, can also perform semantic processing on the query and attempt to discover one or more applications or services related to that query that might be of interest to the user. In this example, the system attempts to locate both applications already on the device and any remote services that might also be related and/or useful. In the example illustrated, the device prioritizes applications already on the device over remote systems or services, such that any located applications on the device 704 will be listed above any located services 708. Here, the device located a rental application that is already on the device, which can help a user to reserve a car. Since the device located additional applications that might be of interest, the interface displays a link 706 to view other located applications that might be of interest, although in other embodiments information for these applications might also be displayed initially with the search results. In at least some embodiments, the user can launch the application directly from the search results page.

The search results page 700 also displays information for at least one service 708 and at least one application 710 that were discovered and not contained on the device, which in at least some embodiments can include at least one top ranked or closest matching application or service based on the semantic processing of the query and any other related information such as user preference, context, etc. The page also includes at least one link (or other selectable element) for viewing information on additional applications or services discovered remote to the device. As discussed, the selection and displaying of applications and services, local and remote to the device, can be based at least in part upon user preferences and/or behavior, such that a user can select to not receive either type of suggestion, and/or suggestions of a certain type might not be displayed if the user never follows suggestions of that type. Further, although the suggestions are shown near the top of this example interface page, it should be understood that the suggestions can be provided in any appropriate location on the page, or on a separate page, popup window, instant message, etc.

As discussed, other information can be used to select appropriate applications and services in addition to the user query. For example, location information (e.g., current GPS data for the device) might be used to narrow a range of options based on the available locations for each discovered service. Similarly, time data (e.g., time of day and/or day of week) can be used to narrow the range of options based on the times in which each service is available. If a user is moving in a certain direction, such as while driving, the device might suggest services that are in the direction the user is going. If the device can determine the user's destination based upon calendar, reservation, or similar data, the device can select services based upon the location of the destination and the time of arrival. Various other types of information can be used as well as discussed elsewhere herein.

Figure 8:
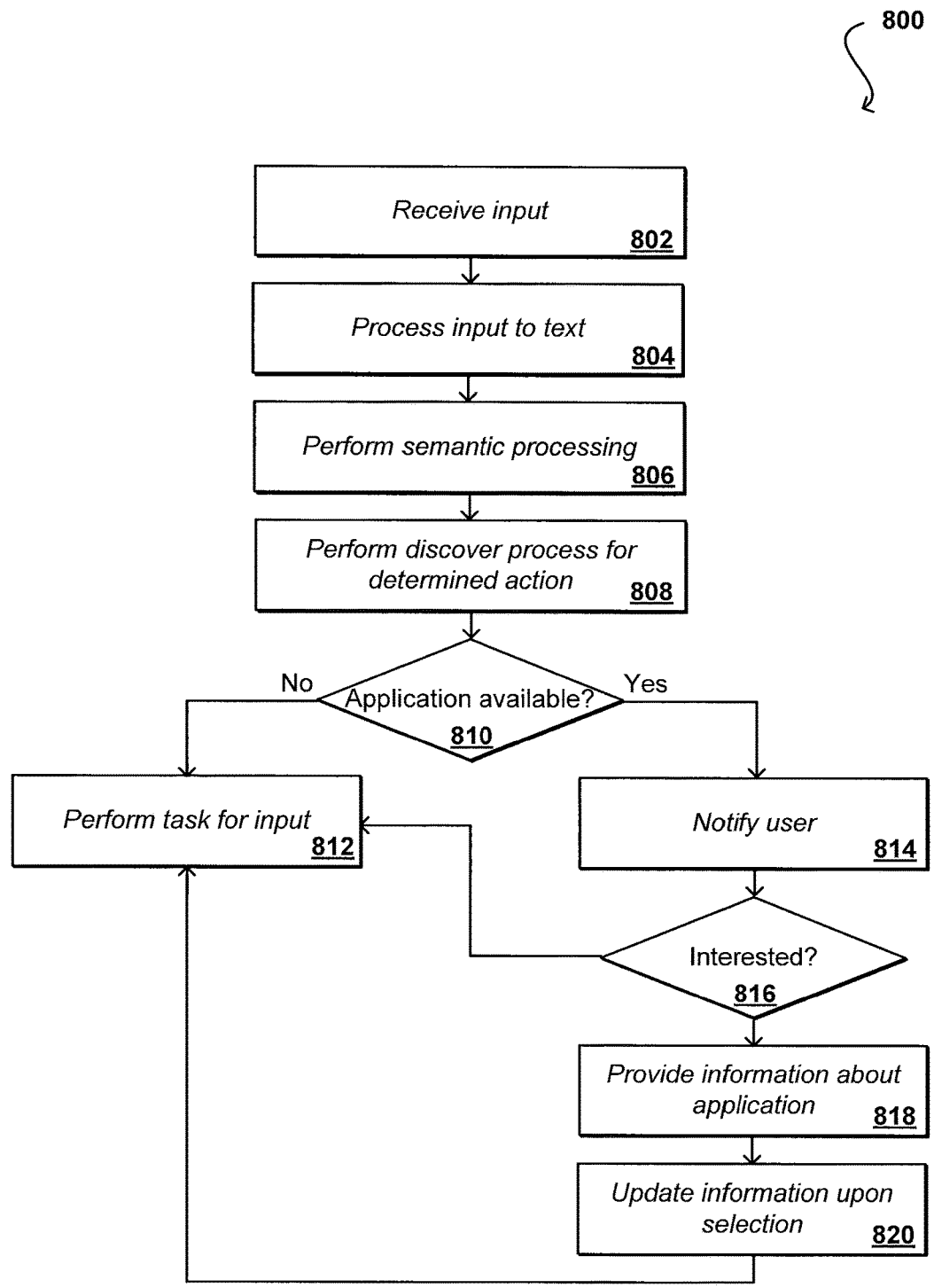
FIG. 8 illustrates an example process for discovering and suggesting applications and services based on user input or action that can be used in accordance with at least one embodiment.

FIG. 8 illustrates an example process 800 that can be used to discover and suggest applications and services that can be used in accordance with various embodiments. It should be understood that for this and any other process discussed herein, there can be additional, fewer, or alternative steps performed in similar or alternative orders, or in parallel, within the scope of the various embodiments unless otherwise stated. In this example, input is received from a user 802. As discussed elsewhere herein, this can involve any appropriate type of input, such as a user entering a search query, creating a task, adding an appointment, speaking a note into a device, performing an action, etc. At around the time of the input, or at a subsequent time as appropriate, the input can be processed to text 804 as necessary, including performing any processing such as removing stop words or symbols, adjusting capitalization, performing stemming, etc. Once suitable text is obtained corresponding to the input, semantic processing can be performed on the text 806 using one or more semantic algorithms. As discussed, this can involve identifying types of words in the input, such as nouns, verbs, action words, object, etc.

After (or during) semantic processing, the device (or a system or remote service) can attempt to discover an application or service for a determined action and/or object using one or more discovery processes 808. In some embodiments, there might be at least one discovery process to attempt to locate applications or information on the device and at least one other discovery process to attempt to locate applications or services remote to the device. In some embodiments, the remote applications or services can be located on other devices associated with that user or device in addition to any offered by third party providers. If one or more applications (or services, etc.) is located and available that matches the processed input (e.g., the action and object(s)), the user can be notified 814 of at least a closest matching application. Based on various factors discussed herein, the at least one suggestion can favor applications on or remote to the device, applications that are free over applications that are not, certain types of applications, etc. If the task or action is complex, or includes multiple portions or sub-tasks, for example, the device can attempt to discover an application or service to attempt with each portion of the task. For example, if the user enters a task to arrange dinner reservations for three specific people, there might be one application or service available to help with contacting each person and coordinating schedules, and another application or service available to make the reservation. The device, a discovery system or service, or another appropriate entity or component can be configured to coordinate the applications or service automatically.

If the user is interested in any of the suggestions 816, such as may be indicated by the user selecting at least one suggestion, the device can provide information about the application 818, which can involve any appropriate process from opening information in a new page to contacting a remote service or launching a local application, among other such processes. If the user selects an application or service to assist with the task, information stored on the device for the task can be updated 820 to include any appropriate information, such as contact information for the provider or information about the application or service. In addition to providing the information, or if the user is not interested or no applications are discovered that sufficiently match the input with a minimum matching criterion, a task relating to the input can be performed 812. The task can be any appropriate task, such as storing information to the device, creating a task, providing search results, updating a calendar or contact, etc.

In some embodiments, application or service providers can be able to bid for certain action words or objects, such that the respective applications and services can be ranked more highly for certain words. Similarly, providers might pay to be featured as the top or featured suggestion for certain actions and/or objects. In some embodiments, a provider can provide one or more incentives to attempt to entice a user to try a service or application. For example, the provider might offer, a free test or electronic coupon for an initial engagement. Other approaches can be used as well, such as to lower a range of acceptable prices for new customers, etc. The presentation of such rankings and/or offers can be overridden by user configuration or other such options. In some embodiments, a user can specify (through configuration or behavior) information to use in selecting and ranking applications and services, such as the selections or actions of other users, the ratings of other users, past experiences with a provider, etc. In at least some embodiments, information about user actions and selections based on suggested applications and services can be uploaded to a central system or service in order to obtain information to be analyzed for future suggestions for this user and/or other users.

In some embodiments, a device can track each action of a user with respect to the device to attempt to provide useful suggestions as quickly as one can be discovered. For example, a user might have the ability to search for applications or information by entering text using a touch screen. If the user wants to open up an email application, for example, the user might not navigate through an interface to attempt to find the appropriate icon to launch the application, but might use a finger to start forming the word "email" on a surface of the device (or in front of a camera or motion sensor, etc.). In some cases, a primary messaging program might be associated with the word "email," whether through configuration or based on user behavior. The device can still attempt to discover applications or services that might help with the task the user is looking to accomplish. For example, the device might discover a service that archives old email messages or performs another such task. Instead of, or in addition to, launching the primary messaging application, the device also can provide a suggestion for the service, another application on the device that can perform messaging, etc. Such an approach is further beneficial because a user does not need to know the name of an application, the appearance or location of the associated icon, or any other information about the application or service. For example, a user wanting to play music on a certain device would not need to know which media player is installed on the device, or available as a service to the device, as the user can simply begin to enter information such as "play music" and the device can return suggestions that can help with that task. Over time, the interaction of a user with these suggestions can help to refine the search and suggestion processes for that user and/or that device. For example, a user might access certain types of files on a smart phone and other types of files on a home computer, and the suggestion algorithms can present different suggestions based upon the particular device (or type of device) the user is using to access information.

A device can also, in some embodiments, continually record and/or buffer audio and/or video content, at least while a user is detected nearby or a mode is otherwise activated. In one example, a device might listen during a phone call, or a user might activate a button to capture the last 20 seconds of a conversation. In certain embodiments, the device can process this input using semantic algorithms and other processes discussed herein to identify actions, objects, or other such words and attempt to discover relevant applications and services. If the text indicates to make a reservation at a particular restaurant, the device can attempt to find a reservation-related service or application. In some embodiments, discovered applications or services can be pushed to a device for the other party as well.

In some embodiments, a device might make suggestions based upon certain events, actions, or occurrences that are not directly related to user input. For example, the device might determine that, based on a current location, for example, a user will not be able to make a reservation. The device might attempt to discover an application or service that can assist in changing the reservation. If conflicting events are scheduled, the device can attempt to discover an application or service that can help in moving at least one of the events, providing a proxy to attend one of the events, etc. The suggestions might be filtered or sorted based on time, location, and availability, among other appropriate information, in order to provide suggestions that are most relevant to the current situation.

In some embodiments, a user might have a preferred provider, such as a neighbor who babysits or walks the dog. The device can, when necessary, check the schedule or availability of that provider, and if the provider is available when needed, recommend that provider as able to assist. If that provider is not available, the device can attempt to discover other providers or services that might be of assistance. In some embodiments, the device can attempt to locate other providers like the preferred provider, or providers whom others (such as those who have used the primary provider) have also used. In some embodiments, social networking information can be used such that the device can indicate when one of the user's friends or connections has utilized and/or recommended a service.

In some embodiments, a user might be able to specify a price, or range of prices, which the user is willing to pay for a type of service. For example, a user might be willing to pay $10/hour for a person to walk the dog, a flat fee of $10 per occurrence, or a monthly fee of $200 that includes one walk per day of at least a given length. In some embodiments, the user might be willing to specify a range of prices, such as up to $15/hour or between $5 and $15 per hour. If a provider provides a service with a price point that matches at least one of these values or ranges, the service might be suggested to the user. In some embodiments, the device and/or provider might be able to negotiate a price. For example, if the user is willing to pay up to $15 per hour for a service, and the provider is willing to accept at little as $10 per hour, then there can be a negotiation (manual or automatic) whereby an agreement can be reached. If there is at least some overlap, the user can at least be notified whether or not an agreed upon price point can be reached. If the price points do not overlap, the user (or provider) in some embodiments can be allowed to contact the other party with a proposed price, such that an agreement might be reached that is outside the normal range of acceptable pricing for at least one of the parties. In some cases, a user or provider might provide other parameters as well, such as $200 per month if more than one person will provide the service, but up to $240 per month if the same person can provide the service (i.e., a person might be willing to pay more if the dog's favorite walker can provide the service).

In some embodiments, a device can be configured to give priority to (or only suggest) applications or services that a user can try out using an existing account. For example, a user might not want to have to go through a setup procedure and create yet another password just to try out a suggested service. If the applications and services subscribe to a centralized identity management service, for example, which enables the user to access those services using an existing account, the user might be much more willing to try the suggested service. In some embodiments, such suggestions might at least be accompanied by a logo or other symbol indicating that they are compatible with an existing user account.

In some cases, a device might make a suggestion based not on new input or a particular occurrence, but a new service becoming available or an existing service being able to serve a particular need. For example, a user might store a grocery list on the device. The user might have other friends in the neighborhood who are willing to pick up items for each other when they go out. Because these friends do not have fixed schedules, however, there will generally be no way for the device to know when one of these friends is going to the store before that person either indicates that they are going to the store or are actually at, or near, the store. When the device receives information about one of these friends being at the store, such as by getting a notification from that person's device, the device can make a suggestion to the user that the user attempt to have that person get one or more items on the list. The other person can always have the option of approving or denying the request, as with all (or at least most) service providers discussed herein.

In some embodiments, as mentioned briefly above, a device can attempt to infer various action words or objects. For example, a device might track user behavior over time. After enough time has passed to determine one or more patterns in the user behavior, the device can attempt to infer action words based upon those patterns. For example, if a user adds an appointment such as "date night" on a calendar and the user always makes dinner reservations or purchases movie tickets for that type of event, the device can infer actions like "reserve" or "purchase" with objects such as "reservations" or "tickets" to attempt to discover applications or services to help with those tasks, even thought the user did not enter anything like an action word or object into the device. In at least some embodiments, the device might also suggest other "date night" appropriate events based on any of a number of factors, such as events that other persons with a similar entry have engaged in or attended, events favored by friends or connections, favored events of the other person for date night, etc.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of suggesting an application, comprising:
   receiving audio input to a first electronic device within a first time period, the audio input relating to a task to be performed by a second electronic device;
   processing data relating to the audio input using at least one semantic processing algorithm within the first time period to determine at least one action word and at least one object word;
   determining a first set of applications associated with the at least one action word and the at least one object word within the first time period, the first set of applications including at least one first application that is not included on the second electronic device but capable of being executed for the second electronic device to perform the task;
   presenting a first suggestion within the first time period to execute the at least one first application for the second electronic device to perform the task;
   determining a second set of applications associated with the at least one action word and the at least one object word within a second time period after the first time period, the second set of applications including at least one second application, different from the at least one first application, that is not included on the second electronic device but capable of being executed for the second electronic device to perform the task; and
   presenting a second suggestion within the second time period to execute the at least one second application for the second electronic device to perform the task.

2. The computer-implemented method of claim 1, further comprising:
   performing at least one text conversion process on the audio input.

3. The computer-implemented method of claim 1, wherein the task does not include a query to a search engine.

4. A computer-implemented method of suggesting an application, comprising:
receiving audio input to a first electronic device within a first time period, the audio input relating to a task to be performed on a second electronic device;
performing semantic processing on data relating to the audio input within the first time period to determine at least one action word;
determining a first set of applications associated with the at least one action word within the first time period, the first set of applications including at least one first application not included on the second electronic device but capable of being executed for the second electronic device to perform the task;
presenting a first suggestion to execute the at least one first application for the second electronic device to perform the task;
determining a second set of applications associated with the at least one action word within a second time period after the first time period, the second set of applications including at least one second application, different from the at least one first application, that is not included on the second electronic device but capable of being executed for the second electronic device to perform the task; and
presenting a second suggestion within the second time period to execute the at least one second application for the second electronic device to perform the task.

5. The computer-implemented method of claim 4, further comprising:
selecting the at least one action word from a list of action words.

6. The computer-implemented method of claim 5, further comprising:
receiving, from a provider of the at least one first application, the at least one action word from among the list of actions words.

7. The computer-implemented method of claim 4, further comprising:
sending the at least one first application to the second electronic device from a remote electronic device.

8. The computer-implemented method of claim 4, further comprising:
selecting the at least one first application from among the first set of applications based at least in part on at least one of a time, location, rating, recommendation, availability, or social networking information associated with the at least one first application.

9. The computer-implemented method of claim 4, wherein the task does not include a query to a search engine.

10. The computer-implemented method of claim 9, wherein multiple matching applications are suggested.

11. The computer-implemented method of claim 10, further comprising:
coordinating the multiple matching applications to perform the task.

12. The computer-implemented method of claim 4, further comprising:
performing at least one text conversion process on the audio input.

13. The computer-implemented method of claim 4, further comprising:
installing the at least one first application on the second electronic device.

14. The computer-implemented method of claim 13, further comprising:
monitoring user interaction with the at least one first application; and
adjusting future suggestions based at least in part on the user interaction.

15. The computer-implemented method of claim 4, further comprising: wherein
performing semantic processing on the data relating to the audio input within the second time period to re-determine the at least one action word.

16. The computer-implemented method of claim 4, further comprising:
analyzing user interaction data aggregated from multiple users of the at least one first application; and
adjusting future suggestions based at least in part on the user interaction data.

17. The computer-implemented method of claim 16, further comprising:
receiving the at least one first application from a provider based at least in part upon the user interaction data aggregated from the multiple users.

18. A computing device, comprising:
a processor; and
memory including instructions that, when executed by the processor, cause the computing device to:
receive audio input to the computing device within a first time period, the audio input relating to a task to be performed on a second computing device;
perform semantic processing on data relating to the audio input within the first time period to determine at least one action word;
determine a first set of applications associated with the at least one action word within the first time period, the first set of applications including at least one first application not included on the second computing device but capable of being executed for the second computing device to perform the task;
present a first suggestion to execute the at least one first application for the second computing device to perform the task;
determine a second set of applications associated with the at least one action word within a second time period after the first time period, the second set of applications including at least one second application, different from the at least one first application, that is not included on the second computing device but capable of being executed for the second computing device to perform the task; and
present a second suggestion within the second time period to execute the at least one second application for the second computing device to perform the task.

19. The computing device of claim 18, wherein the instructions further cause the computing device to:
receive, from a provider of the at least one first application, the at least one action word from among a list of action words.

20. The computing device of claim 18, wherein the task does not include a query to a search engine.

21. A non-transitory computer-readable storage medium including instructions for suggesting an application, the instructions when executed by a processor causing the processor to:
receive audio input to a first computing device within a first time period, the audio input relating to a task to be performed on a second computing device;
perform semantic processing on data relating to the audio input within the first time period to determine at least one action word;

determine a first set of applications associated with the at least one action word within the first time period, the first set of applications including at least one first application not included on the second computing device but capable of being executed for the second computing device to perform the task;

present a first suggestion to execute the at least one first application for the second computing device to perform the task;

determine a second set of applications associated with the at least one action word within a second time period after the first time period, the second set of applications including at least one second application, different from the at least one first application, that is not included on the second computing device but capable of being executed for the second computing device to perform the task; and present a second suggestion within the second time period to execute the at least one second application for the second computing device to perform the task.

22. The non-transitory computer-readable storage medium of claim 21, wherein the instructions further cause the processor to:

receive, from a provider of the at least one first application, the at least one action word from among a list of action words.

23. The non-transitory computer-readable storage medium of claim 21, wherein the task does not include a query to a search engine.

* * * * *